United States Patent [19]

Butcher et al.

[11] Patent Number: 5,386,164
[45] Date of Patent: Jan. 31, 1995

[54] MOTOR ASSEMBLY WITH REMOVABLE LEAD GUARD

[75] Inventors: James A. Butcher, Fort Wayne; Timothy W. Carey, Grabill, both of Ind.

[73] Assignee: General Electric Company, Fort Wayne, Ind.

[21] Appl. No.: 6,043

[22] Filed: Jan. 19, 1993

[51] Int. Cl.$^6$ .......................... H02K 5/22; H02K 5/04
[52] U.S. Cl. ........................................ 310/71; 310/43; 310/89
[58] Field of Search .................... 310/43, 71, 85, 89, 310/42, 66, 91, 272, 273; 174/50, 52.1, 65 R, 50.59

[56] References Cited

U.S. PATENT DOCUMENTS

| | | | |
|---|---|---|---|
| 1,488,498 | 5/1924 | Hoff | 310/71 |
| 2,673,300 | 3/1954 | Furnas et al. | 310/71 |
| 2,845,198 | 7/1958 | Feiertag | 220/3.8 |
| 3,482,128 | 12/1969 | Keck et al. | 310/71 |
| 3,707,637 | 12/1972 | Charlton et al. | 310/71 |
| 4,034,173 | 7/1977 | Crow et al. | 200/80 R |
| 4,038,574 | 7/1977 | Crow et al. | 310/71 |
| 4,523,117 | 6/1985 | Daniels | 310/71 |
| 4,670,631 | 6/1987 | Peachee et al. | 200/80 R |
| 5,093,592 | 3/1992 | Fisher et al. | 310/71 |
| 5,138,212 | 8/1992 | Wong et al. | 310/239 |
| 5,192,888 | 3/1993 | Fleer | 310/71 |
| 5,245,237 | 9/1993 | Fisher et al. | 310/89 |

FOREIGN PATENT DOCUMENTS 1240864 7/1971 United Kingdom .

Primary Examiner—Steven L. Stephan
Assistant Examiner—D. R. Haszko
Attorney, Agent, or Firm—Ralph E. Krisher, Jr.

[57] ABSTRACT

A motor assembly has a lead guard detachably disposed within a housing adjacent a conductor receiving opening formed therein. The lead guard defines a space within the motor housing into which a conductor may be routed. The guard has a generally flat portion and an upstanding portion connected at an angle thereto that extends around three of four perimetral edges of the flat portion. A mounting mechanism is provided to position the lead guard within the housing of the motor. A guide mechanism for guiding conductors fed through the conductor receiving opening into the space defined by the lead guard may also be provided. This guide mechanism may be attached to or integrally molded with the generally flat portion of the lead guard and may include an angled/ramped portion, the edge of which abuts the inner surface of the housing below the conductor receiving opening to prevent conductors from entering the motor housing and coming in contact with rotating components disposed therein.

43 Claims, 2 Drawing Sheets

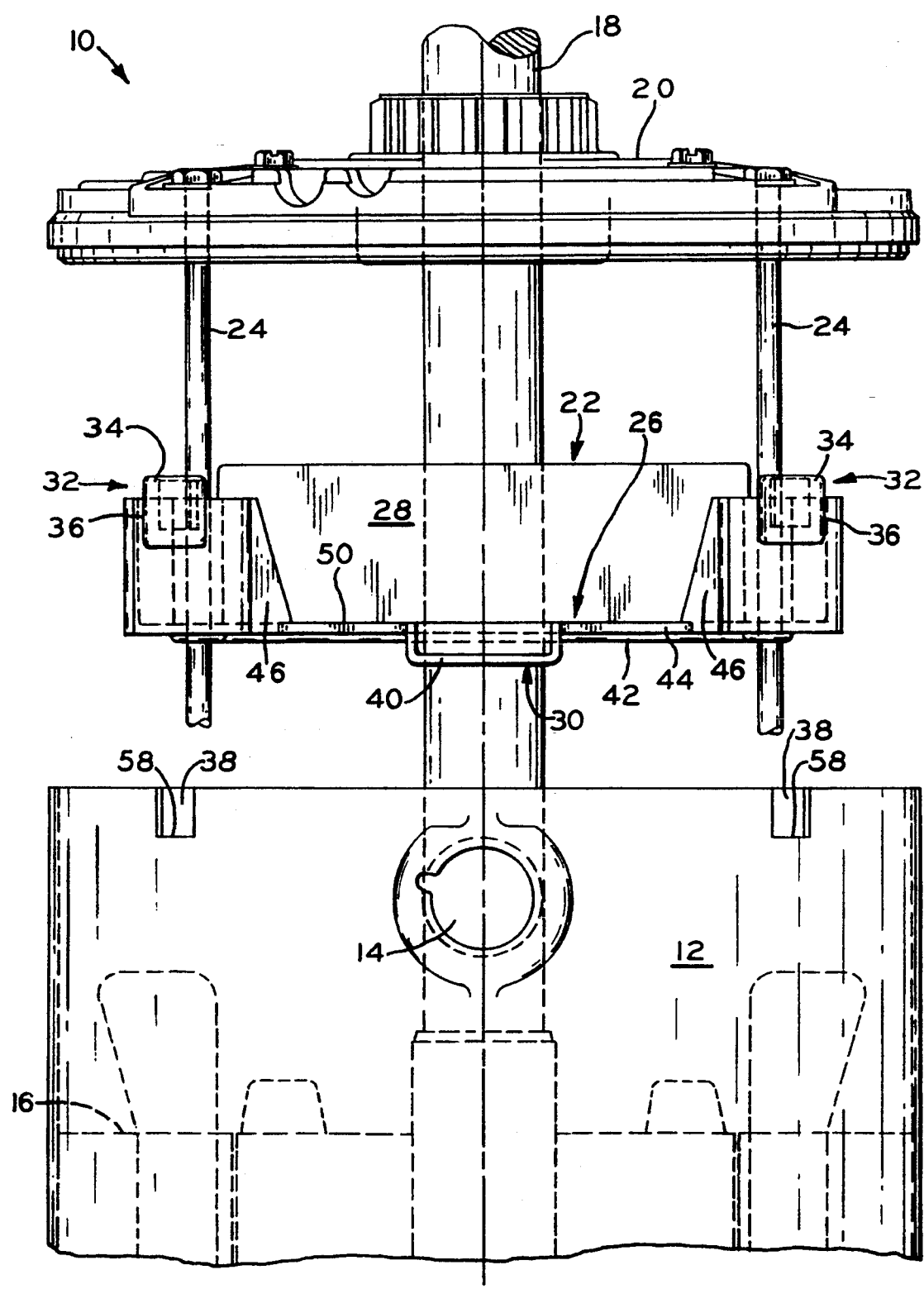
FIG_1

U.S. Patent    Jan. 31, 1995    Sheet 2 of 2    5,386,164
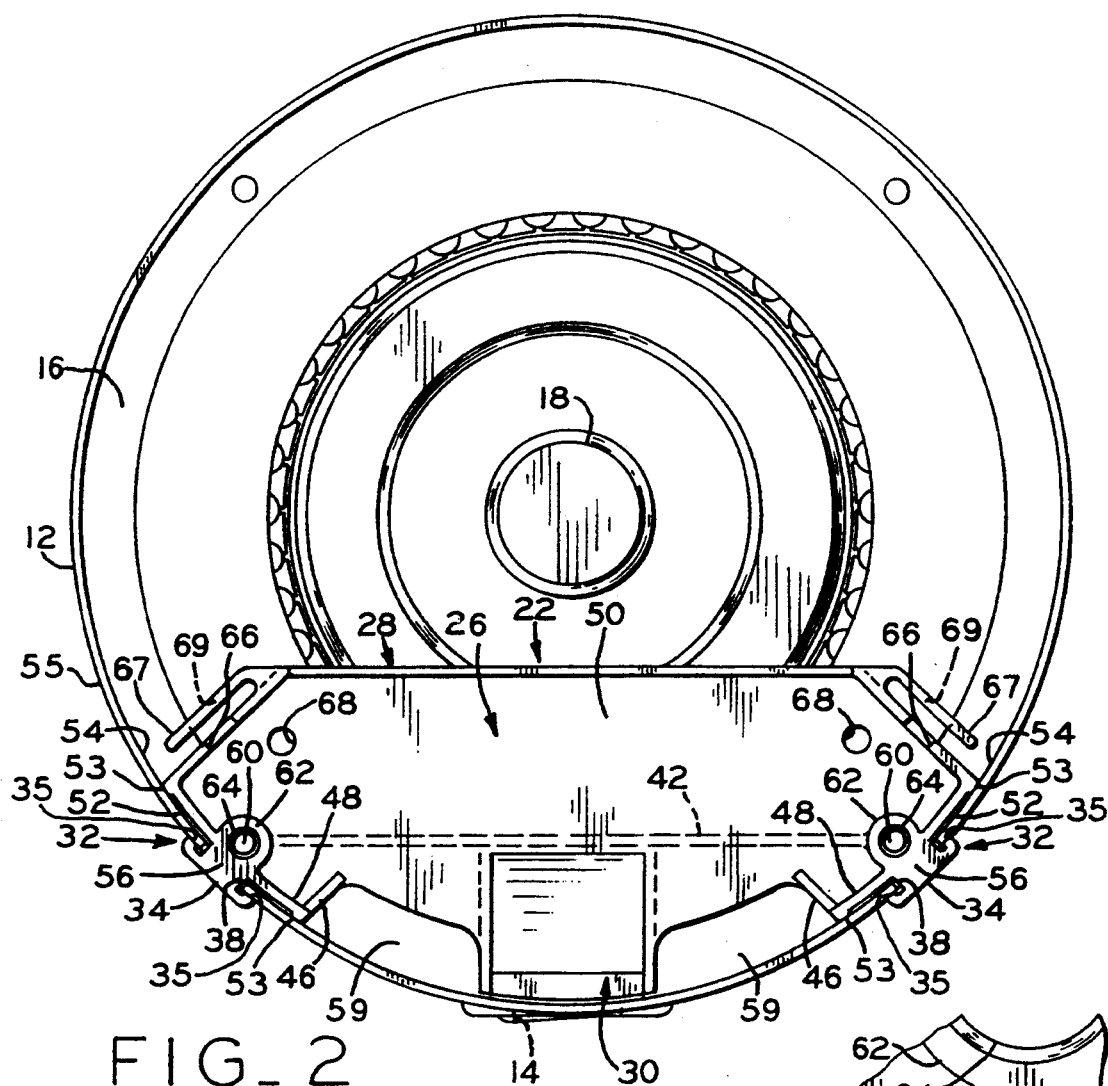
FIG_2
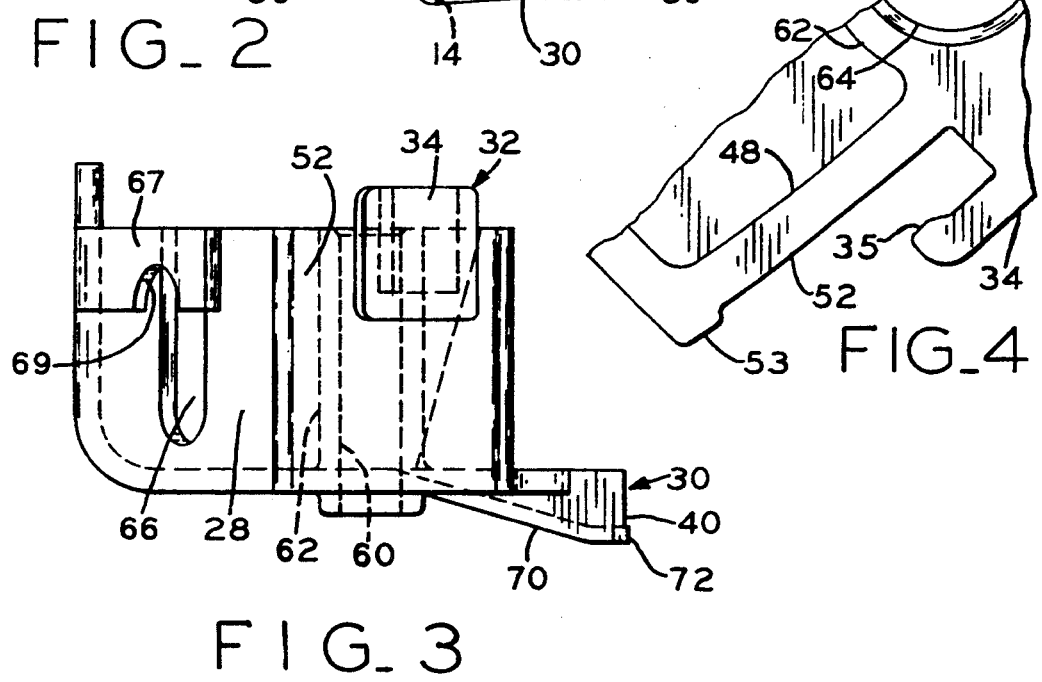
FIG_3    FIG_4

MOTOR ASSEMBLY WITH REMOVABLE LEAD GUARD

BACKGROUND AND SUMMARY OF THE INVENTION

The present invention is directed to an electric motor assembly and more particularly to a motor assembly which includes a lead guard removably mounted inside a motor housing. The lead guard defines a space within the motor housing for connecting various motor control leads (both those coming into and those resident within the motor) and for protecting them from coming in contact with other motor components, particularly those that are moving.

Electric motors often have one or more components mounted therein that regulate the operation of the motor. Terminals of these components, as well as the terminals of the windings of the motor, must be interconnected and joined to external conductors (e.g., a suitable power source) so that the motor may operate. This is typically accomplished via an arrangement that allows conductors extending from these various terminals to be connected together at one location. This location may be defined by structures which are internal to or external to the motor housing (e.g., a "terminal box").

Lead guards include those that are mounted on the interior of the motor housing so as to protect motor conductors from dirt, moisture and moving motor components. These guards are welded onto an interior surface of the housing before the stator winding is installed because of room needed to weld and because of potential damage to the stator windings during welding. At least two problems exist with this arrangement. First, on certain sized stator windings, the lead guard must be bent out of the way when inserting the stator windings and bent back before any electrical leads can be routed. Bending causes "metal fatigue" to points at which the lead guard is bent as well as "structural fatigue" at the welding points. Second, because the lead guard is welded in the housing, when either part is damaged, both parts must be replaced. This adds cost both in terms of additional material and labor.

A lead guard mounted in the interior of the motor housing without welding, subsequent to the insertion of the stator windings, that protects conductors from dirt, moisture, and moving motor components would be a welcome improvement. It is an object of the present invention to provide such an improved lead guard and less costly assembly.

According to the present invention, an electric motor assembly comprises a motor housing, a stator mounted within the motor housing, a pair of end shields mounted adjacent opposing ends of the motor housing having bearings disposed therein for rotatably supporting a rotor adjacent the stator, and a removable lead guard mounted within the motor housing. The lead guard is mounted adjacent a conductor receiving opening in the housing. The lead guard defines a space within the motor housing wherein external and internal electrical conductors may be connected to each other and shielded from the rotating components of the motor assembly. In one embodiment of the invention, the lead guard is molded in a single piece from a thermoplastic material. The plastic lead guard comprises a generally flat portion and an upstanding portion that forms an angle to the perimeter of the flat portion to at least partially define the space within the housing. At least one slot is formed in the generally flat portion through which a conductor may be routed into the space defined by the lead guard. The lead guard has a stiffener integrally formed on a surface of the flat portion to provide strength reinforcement thereto.

In one embodiment of the present invention, the lead guard further comprises structure for guiding conductors entering the motor housing through the opening formed therein into the space at least partially defined by the lead guard to prevent the conductors from entering portions of the housing in which the stator and rotor are mounted. The guide structure is an integrally molded portion of the lead guard having a U-shaped cross section. This embodiment of the lead guard further comprises integrally molded structure for mounting the lead guard to the housing of the motor. The integrally molded mounting structure includes a plurality of flanges formed on opposing portions of the lead guard that engage corresponding slots formed in an edge of the motor housing. Shoulders and lips may be formed on the lead guard to engage respective inner and outer surfaces of the motor housing to anchor the lead guard in the housing. Integrally molded gussets may be provided between the mounting structure and a surface of the flat portion of the lead guard to strengthen the point of connection of the lead guard to the motor housing.

At least one slot may be formed in the upstanding portion through which a conductor may be routed. In one embodiment, this at least one slot may be U-shaped. One or more lead retaining structures in one-to-one correspondence to the number of slots in the upstanding portion may also be provided. These lead retaining structures extend opposite to and on both sides of the slot such that a space is formed between the one or more lead retaining structures and the at least one slot. The one or more lead retaining structures are intended to capture conductors that inadvertently move up in the at least one slot to prevent the conductors from being unintendedly removed therefrom. In one embodiment, the one or more lead retaining structures are integrally molded with the lead guard. A notch may be formed in each of the one or more lead retaining structures to aid in capture of conductors. As with the at least one slot, the notch may be U-shaped.

Other features of the lead guard may include: clamp bolt bosses formed at each of the opposing ends of the body, having holes formed therein which extend through the bosses to accept the body of a through-bolt; at least one or more holes formed through the generally flat portion to allow one or more conductors in the space of the lead guard to be secured via straps extending through the holes; and formation of the lead guard as a single structure from molded plastic material so that all surfaces thereof can be seen from at least one set of two-dimensional perspectives, the set including two different two-dimensional views of the lead guard.

Other objects, advantages and novel features of the present invention will become apparent from the following detailed description of the invention when considered in conjunction with the accompanying drawings.

BRIEF DESCRIPTION OF THE DRAWINGS

FIG. 1 is a partially exploded side elevational view of a motor assembly which comprises a lead guard constructed in accordance with the present invention.

FIG. 2 is top view of the lead guard of FIG. 1 mounted in a motor housing.

FIG. 3 is an isolational side elevational view of the lead guard of FIG. 1.

FIG. 4 is an enlarged view of a portion of the mounting structure of the lead guard constructed in accordance with the present invention.

DETAILED DESCRIPTION OF THE DRAWINGS

An electric motor assembly 10 is shown in FIG. 1. Motor assembly 10 includes a housing 12, having a conductor receiving opening 14, a stator 16 mounted within housing 12, a rotating motor shaft 18 disposed within housing 12 and stator 16, a pair of end shields 20 (only one is shown in FIG. 1), having bearings disposed therein (not shown), mounted adjacent opposing ends of the motor housing, for rotatably supporting shaft 18, and a lead guard 22. Clamp bolts 24 extend through end shields 20, connecting them to housing 12. Clamp bolts 24 also secure terminal lead guard 22 to motor housing 12.

FIG. 1 also shows the basic structure of lead guard 22. Lead guard 22 comprises a generally flat portion 26 to which an upstanding portion 28 is connected at an angle. Upstanding portion 28 extends around three perimetral edges of generally flat portion 26 so as to define a space, as can more clearly be appreciated by reference to FIG. 2. In one embodiment, generally flat portion 26 and upstanding portion 28 are integrally molded from plastic.

Referring again to FIG. 1, guide structure 30 is shown. As can be seen, guide structure 30 is U-shaped in cross section. This shape, combined with a flat portion and an inclined portion (both of which are shown in FIG. 3) facilitates the insertion of conductors (not shown) into the space defined by lead guard 22 in motor housing 12 immediately adjacent conductor receiving opening 14.

Lead guard 22 can be removably mounted in housing 12 via mounting structure 32. Mounting structure 32 includes flanges 34 formed on upper portions 36 of upstanding portion 28. Flanges 34 are designed to be received in corresponding slots 38 formed in housing 12. Slots 38 are sized so that flanges 34 fit snugly therein so as to correctly position lead guard 22 within housing 12. Proper positioning within housing 12 is particularly important with regard to the relative locations of guide structure 30 and conductor receiving opening 14. Lead guard 22 must remain flush with the interior surface of housing 12 and not be allowed to cant therefrom. If canting occurs, then end 40 of guide structure 30 may obstruct a portion of conductor receiving opening 14. This in turn may cause conductors entering opening 14 to be deflected by end 40 into the motor housing instead of the space defined by generally flat portion 26 and upstanding portion 28 of lead guard 22.

Stiffener/rib 42 is shown on bottom surface 44 of generally flat portion 26 extending for a majority of the length thereof. Stiffener/rib 42 reinforces lead guard 22, providing strength along its length. Also shown are gussets 46 mounted between interior surface 48 (see FIG. 2) of upstanding portion 28 and top surface 50 of generally flat portion 26. Gussets 46 are intended to provide strength to lead guard 22 at its point of attachment to housing 12 via flanges 34 and corresponding slots 38.

FIG. 2 shows lead guard 22 mounted in motor housing 12. As can be seen, flanges 34 mount lead guard 22 in housing 12 so that a portion of exterior surface 52 of upstanding portion 28 is disposed adjacent inner surface 54 of housing 12. The proper depth of insertion of lead guard 22 into housing 12 is controlled by posts 56 which determine the extent to which lead guard 22 is placed into housing 12 when they make contact with bottom edges 58 of slots 38 (see FIG. 1).

Referring again to FIG. 2, shoulders 53 are shown extending from exterior surface 52. As can be seen, shoulders 53 flank both sides of flange 34 and make contact with inner surface 54 of housing 12. Lips 35 formed on opposing edge portions of flange 34 are also shown in FIG. 2. Lips 35 extend toward outer surface 55 of housing 12 and make contact therewith. Shoulders 53 and lips 35 cooperate with respective inner and outer surfaces 54 and 55 to anchor lead guard 22 within housing 12. FIG. 4 shows an enlarged view of one of each of the shoulders 53 and lips 35.

Referring again to FIG. 2, slots 59 formed in generally flat portion 26 are shown flanking both sides of guide structure 30. Slots 59 are provided to allow internal motor conductors such as those of stator 16 to be routed therethrough and into the space defined by lead guard 22 for connection with external conductors. The external conductors are fed into the motor via conductor receiving opening 14 (see FIG. 1) and guide structure 30.

Clamp bolt holes 60 are also shown in FIG. 2 extending through upstanding bosses 62 that are integrally formed or cast on top surface 50 of generally flat portion 26 and interior surface 48 of upstanding portion 28. Bosses 62 direct clamp bolts 24 (see FIG. 1) through lead guard 22 and also provide support thereto. Bushings 64 are shown disposed in bosses 62. Bushings 64 are intended to resist abrasion that would normally occur on the inside of bosses 62 due to contact with clamp bolts 24.

An outline of stiffener/rib 42 which is mounted on bottom surface 44 is shown extending between bosses 62. Also shown between interior surface 48 and top surface 50 of generally flat portion 26 are gussets 46. As discussed previously with regard to FIG. 1, stiffener/rib 42 and gussets 46 provide strength to lead guard 22 along its length and at its points of attachment to motor housing 12, respectively.

FIG. 3 shows U-shaped slot 66 in upstanding portion 28, two of which can be seen in FIG. 2. Slots 66 allow for the routing of motor component control conductors from or into the space defined by lead guard 22. Adjacent U-shaped slots 66 are holes 68 extending through generally flat portion 26 (see FIG. 2). Holes 68 allow one or more of the conductors routed through either slots 59 or U-shaped slots 66 to be tied down via a strip (not shown) extending around each of the conductors and through the holes.

A lead retaining structure 67 is shown in FIGS. 2 and 3 integrally molded to exterior surface 52 of upstanding portion 28 on opposing portions of lead guard 22. As seen best in FIG. 3, lead retaining structure 67 has a U-shaped notch 69 formed therein. Notch 69 is positioned to lie opposite slot 66 so as to capture motor compartment control conductors that inadvertently move up in slot 66 to prevent them from coming out. Depending on the relative size of a conductor to slot 66, it may be necessary to route the conductor through the space between lead retaining structure 67 and the portion of the area of exterior surface 52 of lead guard 22 that lead retaining structure 67 extends parallel to prior to insertion in slot 66.

Inclined portion 70 and level portion 72 of guide structure 30 are also shown in FIG. 3. As discussed previously in reference to FIG. 1, end 40 of guide structure 30 abuts inner surface 54 of motor housing 12 immediately below conductor receiving opening 14. This abutment is designed to prevent the conductors from extending down between lead guard 22 and motor housing 12 where they would travel into unintended portions of the motor compartment. Conductors routed through opening 14 first contact level portion 72 and then inclined portion 70 which directs them into the space defined by lead guard 22.

Referring again to FIG. 1, lead guard 22 of the embodiment shown therein is constructed entirely from plastic. Furthermore, all surfaces of lead guard 22 can be seen from at least one set of two-dimensional perspectives, the set including two different two-dimensional views of the lead guard. This allows the lead guard to be cast using only two mold halves and, thus, aids in the manufacturing process by reducing additional tooling expense incurred when more than two molds are used to cast the lead guard.

From the preceding description, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. An electric motor assembly, comprising:
   a motor housing;
   a stator mounted within the motor housing;
   a pair of end shields mounted adjacent opposing ends of the motor housing having bearings disposed therein for rotatably supporting a rotor adjacent the stator; and
   a lead guard removably mounted within the motor housing adjacent a conductor receiving opening in the housing, said lead guard including a generally flat portion having first and second ends and first and second sides and an upstanding wall coupled to said first and second ends and said first side of said generally flat portion so that said second side is open and said generally flat portion and upstanding wall define a space within the motor housing wherein external and internal electrical conductors are connected to each other and shielded from the rotating components of the motor assembly.

2. The motor assembly of claim 1, wherein the lead guard is constructed from plastic.

3. The motor assembly of claim 1, wherein the generally flat portion of said lead guard is configured to include at least one slot through which a conductor is routed into the space defined by the lead guard.

4. The motor assembly of claim 3, wherein the lead guard has a stiffener integrally formed on a surface of the flat portion to provide strength reinforcement thereto.

5. The motor assembly of claim 1, wherein the lead guard further comprises means for guiding conductors entering the motor housing through the opening formed therein into the space defined by the lead guard to prevent the conductors from entering portions of the housing in which the stator and rotor are mounted.

6. The motor assembly of claim 5, wherein the guiding means is an integrally molded portion of the lead guard.

7. The motor assembly of claim 5, wherein the guiding means is U-shaped in cross section.

8. The motor assembly of claim 1, wherein the lead guard further comprises integrally molded means for mounting the lead guard to the housing of the motor.

9. The motor assembly of claim 8, wherein the integrally molded mounting means includes a plurality of flanges formed on opposing portions of the lead guard that engage corresponding slots formed in an edge of the motor housing.

10. The motor assembly of claim 9, wherein lips are formed on opposing edge portions of each of said plurality of flanges, said lips engaging an outer surface of said housing to anchor said lead guard in the housing.

11. The motor assembly of claim 9, wherein shoulders extend from exterior portions of said lead guard so as to flank both sides of each of said plurality of flanges, said shoulders engaging an inner surface of said housing to anchor said lead guard in the housing.

12. The motor assembly of claim 8, wherein the mounting means further includes integrally molded gussets between the mounting means and a surface of the flat portion to strengthen the point of connection of the lead guard to the motor housing.

13. A lead guard for a motor assembly having a housing and a conductor receiving opening in the housing, comprising:
   a body having a generally flat portion configured to include first and second ends and first and second sides and an upstanding portion attached to the first and second ends and first side of the generally flat portion so that the second side is open and said generally flat portion and said upstanding portion define a space within the motor housing into which a conductor is routed; and
   means for removably mounting the body within the housing adjacent the conductor receiving opening.

14. The lead guard of claim 13, wherein the body is formed from plastic.

15. The lead guard of claim 13, wherein the body has a rib integrally formed on a surface of the flat portion to provide strength reinforcement thereto.

16. The lead guard of claim 13, further comprising means for guiding conductors entering the motor housing through the opening formed therein into the space defined by the lead guard to prevent the conductors from entering portions of the housing in which rotating components are located.

17. The lead guard of claim 16, wherein the guiding means is an integrally molded portion of the generally flat portion.

18. The lead guard of claim 17, wherein the guiding means is U-shaped in cross section.

19. The lead guard of claim 18, wherein a portion of the guiding means extends angularly downwardly from the lead guard so that an edge of a generally flat portion of the guide means abuts an interior surface of the housing adjacent the conductor receiving opening.

20. The lead guard of claim 13, wherein the body is formed so that all the surfaces of said lead guard are visible from at least one set of two-dimensional perspectives, the set including two different two-dimensional views of the lead guard.

21. The lead guard of claim 13, wherein the means for removably mounting includes a plurality of flanges formed on opposing portions of the body that engage corresponding slots formed in an edge of the motor housing.

22. The lead guard of claim 21, wherein lips are formed on opposing edge portions of each of said plurality of flanges, said lips engaging an outer surface of said housing to anchor said lead guard in the housing.

23. The lead guard of claim 22, wherein shoulders extend from exterior portions of said lead guard so as to flank both sides of each of said plurality of flanges, said shoulders engaging an inner surface of said housing to anchor said lead guard in the housing.

24. The lead guard of claim 13, wherein the means for removably mounting includes integrally molded gussets between the mounting means and a surface of the flat portion to strengthen the point of connection of the lead guard to the motor housing.

25. The lead guard of claim 13, wherein the upstanding portion has a slot formed therein through which a conductor is routed.

26. The lead guard of claim 25, wherein the slot formed in the upstanding portion is U-shaped.

27. The lead guard of claim 25, further including a lead retaining structure formed on the upstanding portion so that the lead retaining structure lies opposite of and defines a space between said slot, the lead retaining structure capturing conductors that move up in said at least one slot to prevent said conductors from being unintentionally removed from the at least one slot.

28. The lead guard of claim 27, wherein the lead retaining structure is integrally molded.

29. The lead guard of claim 27, wherein said lead retaining structure has a notch formed therein.

30. The lead guard of claim 29, wherein said notch is U-shaped.

31. The lead guard of claim 16, wherein the generally flat portion is configured so that the ends are angled relative to the sides towards the guiding means.

32. The lead guard of claim 31, wherein the body is configured to include clamp bolt bosses formed on the upstanding portion at each of the ends of the generally flat portion.

33. The lead guard of claim 13, wherein the generally flat portion has a hole formed therethrough to allow the conductor in the space of the lead guard to be secured via a strap extending through the hole.

34. An electric motor assembly, comprising:
a motor housing;
a stator mounted within the motor housing;
a pair of end shields mounted adjacent opposing ends of the motor housing having bearings disposed therein for rotatably supporting a rotor adjacent the stator;
a lead guard removably mounted within the motor housing adjacent a conductor receiving opening in the housing, said lead guard at least partially defining a space within the motor housing wherein external and internal electrical conductors are connected to each other and shielded from the rotating components of the motor assembly; and
integrally molded means for mounting the lead guard to the housing of the motor;
wherein the integrally molded mounting means includes a plurality of flanges formed on opposing portions of the lead guard that engage corresponding slots formed in an edge of the motor housing.

35. The motor assembly of claim 34, wherein lips are formed on opposing edge portions of each of said plurality of flanges, said lips engaging an outer surface of said housing to anchor said lead guard in the housing.

36. The motor assembly of claim 34, wherein shoulders extend from exterior portions of said lead guard so as to flank both sides of each of said plurality of flanges, said shoulders engaging an inner surface of said housing to anchor said lead guard in the housing.

37. A lead guard for a motor assembly having a housing and a conductor receiving opening in the housing, comprising:
a body having a generally flat portion and an upstanding portion attached at an angle to the generally flat portion and extending around the perimeter thereof, and having at least one slot formed therein to at least partially create a space within the motor housing into which a conductor is routed; and
integrally molded means for removably mounting the body within the housing adjacent the conductor receiving opening;
wherein the integrally molded mounting means includes a plurality of flanges formed on opposing portions of the body that engage corresponding slots formed in an edge of the motor housing.

38. The lead guard of claim 37, wherein lips are formed on opposing edge portions of each of said plurality of flanges, said lips engaging an outer surface of said housing to anchor said lead guard in the housing.

39. The lead guard of claim 38, wherein shoulders extend from exterior portions of said lead guard so as to flank both sides of each of said plurality of flanges, said shoulders engaging an inner surface of said housing to anchor said lead guard in the housing.

40. A lead guard for a motor assembly having a housing enclosing components of the motor, comprising:
a generally flat portion with a four-sided perimeter;
an upstanding wall coupled to three sides of the perimeter of the generally flat portion so that the fourth side is open and the generally flat portion and upstanding portion define a space physically isolated from moving components of the motor with the housing; and
means coupled to the upstanding portion for engaging at least one slot formed in the housing so that the lead guard is mounted within the housing.

41. The lead guard of claim 40, wherein the housing is configured to include two slots and further wherein the engaging means includes a pair of flanges coupled to the upstanding wall and each disposed in one of the slots of the housing.

42. A lead guard for a motor assembly having a housing enclosing components of the motor assembly, comprising:
a body configured to define a space within the housing physically isolated from moving components of the motor within the housing and further configured to include a slot for routing of a motor component lead into the space;
means coupled to the body for retaining the lead within the slot; and
means coupled to the body for engaging at least one slot formed in the housing to mount the lead guard within the housing.

43. The lead guard of claim 42, wherein the retaining means includes a lead retaining structure cantilevered to the body in confronting relation to the slot.

* * * * *